L. S. NASH.
AIR VALVE FOR PNEUMATIC CONTROL SYSTEMS.
APPLICATION FILED AUG. 24, 1907.
953,795.
Patented Apr. 5, 1910.
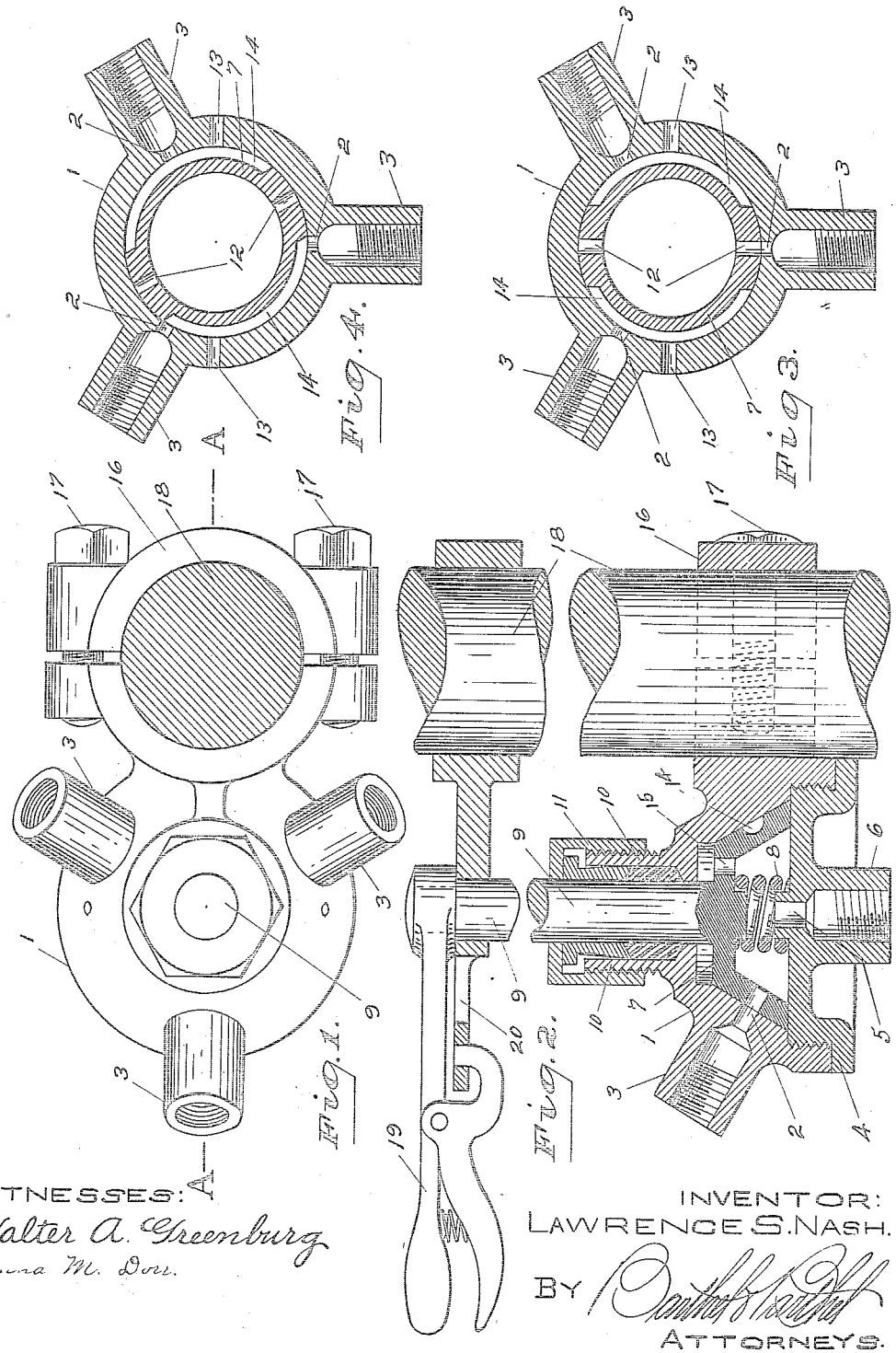
WITNESSES:
Walter A. Greenburg
Anna M. Dorr
INVENTOR:
LAWRENCE S. NASH.
BY 
ATTORNEYS.

UNITED STATES PATENT OFFICE.

LAWRENCE S. NASH, OF DETROIT, MICHIGAN, ASSIGNOR TO CHARLES BRUSHABER, OF DETROIT, MICHIGAN.

AIR-VALVE FOR PNEUMATIC CONTROL SYSTEMS.

953,795.   Specification of Letters Patent.   Patented Apr. 5, 1910.

Application filed August 24, 1907. Serial No. 389,995.

*To all whom it may concern:*

Be it known that I, LAWRENCE S. NASH, a citizen of the United States of America, residing at Detroit, in the county of Wayne and State of Michigan, have invented certain new and useful Improvements in Air-Valves for Pneumatic Control Systems, of which the following is a specification, reference being had therein to the accompanying drawings.

This invention relates to a multiport valve for controlling a pneumatic system, and especially to certain features whereby the valve closure is balanced and whereby leakage is reduced to a minimum.

The invention consists in the matters hereinafter set forth, and more particularly pointed out in the appended claim.

Referring to the drawings, Figure 1 is a plan view of a valve embodying the features of the invention. Fig. 2 is a view in longitudinal section on line A—A of Fig. 1. Fig. 3 is a diagrammatic, cross-sectional view through the casing and closure, showing the valve in a closed neutral position. Fig. 4 is a diagrammatic, cross-sectional view showing one of the outlet ports open, and the others relieved.

The valve, as herein shown, is especially adapted for a pneumatic control system for automobiles or the like wherein the clutch and the brake are thrown in and out by air under pressure.

In the drawings, 1 represents a circular casing of a valve, having a frusto-conical, centrally apertured valve-seat and a number of discharge ducts 2 radially leading from the periphery thereof through symmetrically disposed nipples 3 formed integrally on the casing, and interiorly screw-threaded or otherwise fitted for pipe connections whereby each may be coupled respectively with pneumatic means for operating the clutch, the service brake and the emergency brake of an automobile. A flanged base 4 closes the lower end of the casing, which is counter-bored and screw-threaded to receive it, and an air inlet or supply duct 5 in a depending axial boss 6 communicates with the casing interior.

The valve-seat is counterbored to afford clearance and a relief space for a conoidal valve-closure 7 closed at its upper, smaller end, which is held in yielding engagement with the seat by a spring 8 in compression between the closure and base, and is rotated by an axial stem 9 suitably secured thereto, extending through a chambered hub 10 on the casing. A suitable cap 11 screw-threaded onto the hub, forms therewith a stuffing box or packing gland.

Diametrically opposite outlet ports 12 are so disposed in the closure that they may each be brought into register with any one of the discharge ducts 2. Diametrically opposite exhaust ports 13 are formed in the casing in the horizontal plane of the outlet ports 12, and may be connected to the outlet ports by peripheral channels 14 in the closure face, between and in the plane of the ports.

The valve-closure is balanced through the medium of a relief port 15 in its upper end, so that air entering the casing through the inlet or supply duct 5 exerts the same pressure on both sides of the closure, their effective areas being substantially equal. This allows free action, as the closure spring alone holds the closure to seat.

The casing may have any supporting lugs or brackets desired. As the form herein shown is designed for use in an automobile pneumatic control system, a split clamp 16 with bending cap-screws 17 is provided for securing the casing to a steering post 18.

A suitable latched handle 19 on the stem with quadrant 20 on the support, may be used to aid in bringing the several ports in register as desired, the stem being of any length to bring the handles near to the station of the operator.

In operation, the position in Fig. 4, shows both outlet ports closed and all their ducts in communication with the relief ports, so that any pressure in the connections or chambers is relieved and the air allowed to escape when the outlet ports are closed. When any one of the outlet ports is opened the pneumatic means piped thereto is actuated to operate its respective mechanism.

The conoidal form of the seat makes the closure self-centering and causes it to wear evenly and to fit tightly, thus avoiding leakage.

Obviously, the number and disposition of the various ducts, ports and channels, as well as other details of construction, may be varied without departing from the spirit of the invention, and I do not care to limit myself to any particular form or arrangement of parts.

What I claim as my invention is:

A multi-port air valve comprising a conoidal casing, having a centrally recessed frusto-conical valve seat, a base screw-threaded into the casing, a conoidal closure presenting substantially equal pressure areas to the recess and the casing interior held upwardly against the seat by a spring in compression between the casing base and closure, an axial stem in the closure extending through the recess, a packing gland on the casing, radial nipples integral with the casing fitted for pipe connections, radial outlet ducts from the valve-seat extending axially through the nipples, exhaust ports in the casing from the seat between the nipples, an axial depending boss on the base, an inlet through the said boss opposite the closure, ports through the closure periphery adapted to register with the ducts, channels in the valve seat face extending around the periphery between the ducts adapted to connect the exhaust ports and ducts when the latter are not in register with the closure ports, and a split clamp on the side of the casing for supporting it.

In testimony whereof I affix my signature in presence of two witnesses.

LAWRENCE S. NASH.

Witnesses:
C. R. STICKNEY,
A. M. DORR.